United States Patent
Minola

(10) Patent No.: US 9,581,040 B2
(45) Date of Patent: Feb. 28, 2017

(54) MODULE, SYSTEM AND METHOD FOR GENERATING ELECTRIC POWER INSIDE A PIPELINE

(71) Applicant: SAIPEM S.p.A., San Donato Milanese (IT)

(72) Inventor: Paolo Minola, Peschiera Borromeo (IT)

(73) Assignee: SAIPEM S.P.A., San Donato Milanese (IT)

( * ) Notice: Subject to any disclaimer, the term of this patent is extended or adjusted under 35 U.S.C. 154(b) by 14 days.

(21) Appl. No.: 14/433,232

(22) PCT Filed: Oct. 4, 2013

(86) PCT No.: PCT/IB2013/059122
§ 371 (c)(1),
(2) Date: Apr. 2, 2015

(87) PCT Pub. No.: WO2014/054030
PCT Pub. Date: Apr. 10, 2014

(65) Prior Publication Data
US 2015/0252684 A1 Sep. 10, 2015

(30) Foreign Application Priority Data
Oct. 4, 2012 (IT) .............................. MI2012A1662

(51) Int. Cl.
*F01D 15/10* (2006.01)
*F01D 1/04* (2006.01)
(Continued)

(52) U.S. Cl.
CPC ................ *F01D 15/10* (2013.01); *F01D 1/04* (2013.01); *F01D 25/285* (2013.01); *F03D 1/04* (2013.01); *Y02E 10/72* (2013.01)

(58) Field of Classification Search
CPC .......... F03D 1/04; F01D 25/285; F01D 15/10; F01D 1/04
(Continued)

(56) References Cited

U.S. PATENT DOCUMENTS 3,546,474 A * 12/1970 De Courcy et al. .. H02J 7/1415
290/1 R
3,837,214 A * 9/1974 Guest .................. F16L 55/1283
73/40.5 R
(Continued)

FOREIGN PATENT DOCUMENTS

DE 196 08 369 9/1997
GB WO 2011138659 A2 * 11/2011 ............... F03D 1/00
(Continued)

OTHER PUBLICATIONS

International Search Report and Written Opinion for International Application No. PCT/IB2013/059122 dated Jan. 21, 2014.

*Primary Examiner* — Viet Nguyen
(74) *Attorney, Agent, or Firm* — Neal, Gerber & Eisenberg LLP

(57) ABSTRACT

A module, configured to generate electric power inside a pipeline, in particular as the pipeline is being laid on the bed of a body of water, has a turbine configured to intercept an airflow fed in a travelling direction; and a rotating electric machine connected to the turbine, surrounding the turbine, and configured to produce electric power.

23 Claims, 6 Drawing Sheets

(51) Int. Cl.
*F01D 25/28* (2006.01)
*F03D 1/04* (2006.01)

(58) Field of Classification Search
USPC .............................................. 290/52, 43, 54
See application file for complete search history.

(56) References Cited

U.S. PATENT DOCUMENTS

| | | | |
|---|---|---|---|
| 3,978,678 A | | 9/1976 | Duncan et al. |
| 4,498,811 A | | 2/1985 | Fern et al. |
| 4,852,391 A | * | 8/1989 | Ruch .................... F16L 55/1283 104/138.2 |
| 5,797,421 A | * | 8/1998 | Merrett .................. A62C 35/68 137/236.1 |
| 8,294,290 B2 | * | 10/2012 | da Silva ................ F03B 13/105 290/52 |
| 2003/0184096 A1 | * | 10/2003 | Newman ................. F03B 13/24 290/54 |
| 2005/0285407 A1 | * | 12/2005 | Davis ...................... F03B 3/128 290/54 |
| 2010/0066089 A1 | * | 3/2010 | Best .......................... F03B 3/06 290/52 |
| 2010/0310361 A1 | * | 12/2010 | Carre ...................... F03D 1/025 415/199.5 |
| 2011/0214511 A1 | * | 9/2011 | Fjerdingstad ........ G01N 1/2035 73/861.41 |
| 2013/0062881 A1 | * | 3/2013 | Mellah .................. H02K 7/1823 290/50 |
| 2013/0113216 A1 | * | 5/2013 | Shrosbree ................. F03D 1/00 290/54 |
| 2014/0157767 A1 | * | 6/2014 | Ghouse ............... F03B 13/1815 60/502 |
| 2015/0167626 A1 | * | 6/2015 | Roberts .................. F03B 13/08 415/121.3 |

FOREIGN PATENT DOCUMENTS

| | | |
|---|---|---|
| WO | WO 03/042594 | 5/2003 |
| WO | WO 2007/040403 | 4/2007 |
| WO | WO 2007/086814 | 8/2007 |
| WO | WO 2010/032087 | 3/2010 |

* cited by examiner

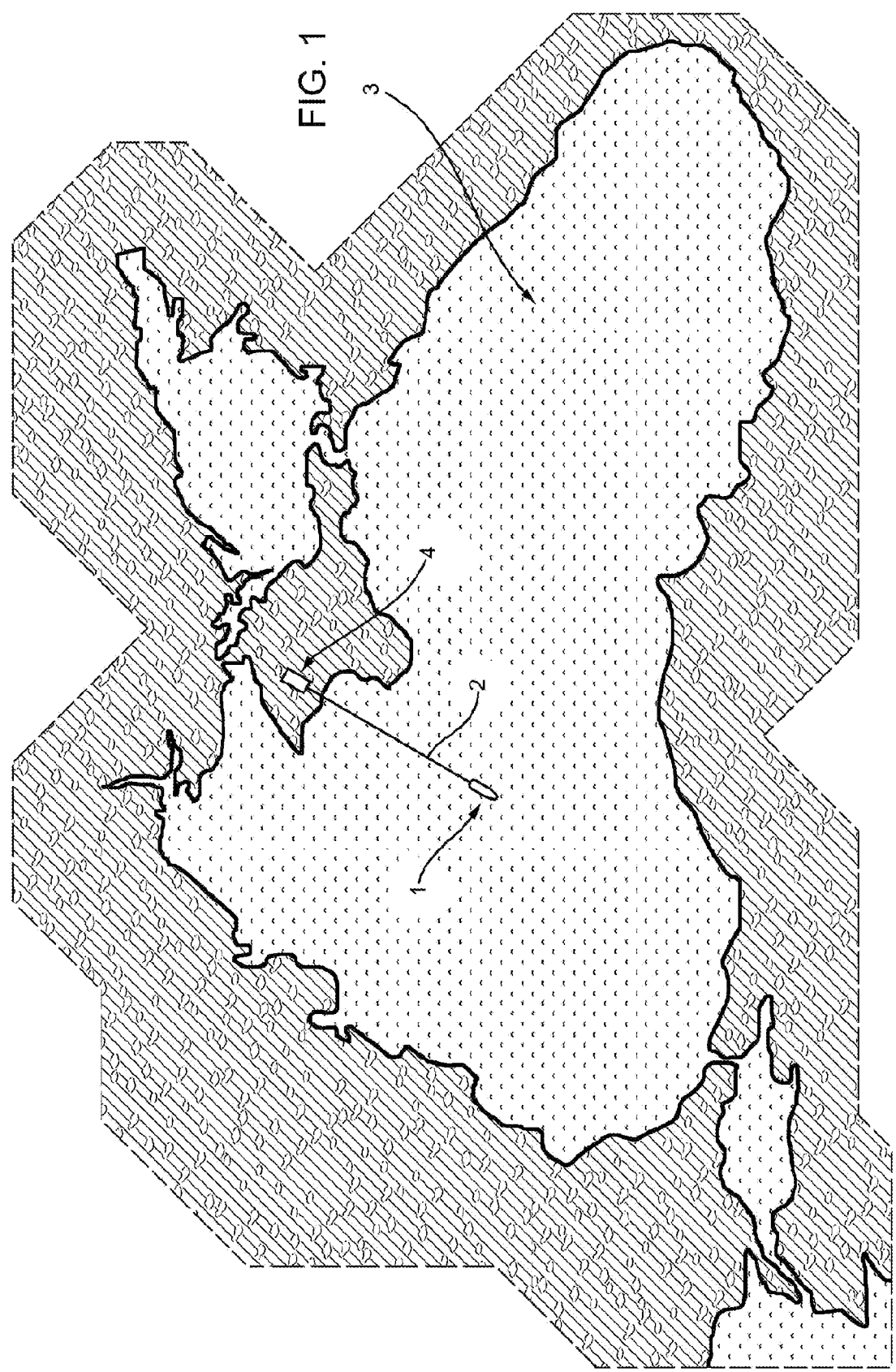

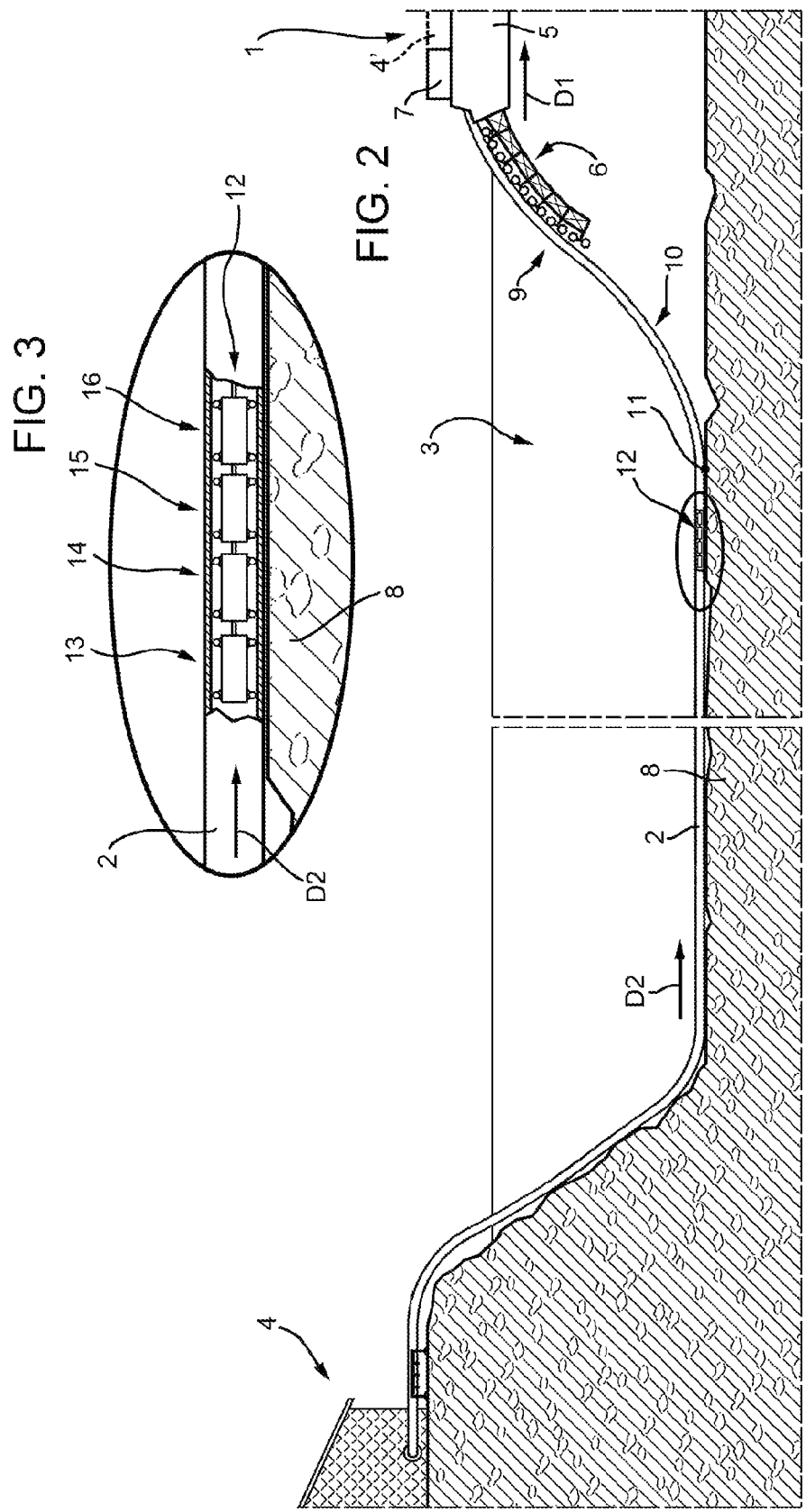

MODULE, SYSTEM AND METHOD FOR GENERATING ELECTRIC POWER INSIDE A PIPELINE

PRIORITY CLAIM

This application is a national stage application of PCT/IB2013/059122, filed on Oct. 4, 2013, which claims the benefit of and priority to Italian Patent Application No. MI2012A 001662, filed on Oct. 4, 2012, the entire contents of which are each incorporated by reference herein.

BACKGROUND

In the transportation of hydrocarbons, underwater pipelines are laid on the bed of a body of water and, once laid, pipe the hydrocarbons over distances of hundreds of kilometres. Pipelines of this sort are normally constructed on board a laying vessel and launched onto the bed of the body of water.

Pipelines are constructed and launched using various types of laying vessels, each designed to employ a specific laying method, and which are selected according to the depth of the bed. One known type of laying vessel, suitable for relatively shallow beds, has a substantially horizontal assembly line for constructing the pipeline; and a so-called S-lay ramp—so called from the shape assumed by the pipeline between the laying vessel and the bed of the body of water. Another known type of laying vessel, suitable for deep beds, is designed to join pipe sections along a substantially vertical assembly line, and has a so-called J-lay ramp—also so called from the shape assumed by the pipeline between the laying vessel and the bed of the body of water.

In both cases, the pipeline section between the laying vessel and the bed of the body of water is subjected to bending stress. Specifically, the pipeline forms one curve using the J-lay method, and two curves using the S-lay method. At the laying stage and until the pipeline comes into operation, the pipeline is empty, and the external pressure, especially at exceptional depths, is much greater than the pressure inside the pipeline. It should be appreciated that underwater pipelines may be laid at depths of up to 3,000 metres, so sharp curves combined with the difference between the internal and external pressure may result in crushing, failure, and flooding of the pipeline. This is a relatively extremely serious occurrence that results in irreparable damage of at least part of the pipeline, which must be removed and replaced, and involves clearing the flooded pipeline, which is a relatively highly expensive, time-consuming process.

One known way of minimizing such damage is to insert at least one plug inside the pipeline, move the plug along the pipeline, and expand the plug to prevent the pipeline section upstream from the plug from flooding in the event of the pipeline failing.

Various methods of moving the plug along the pipeline are known. For example, in U.S. Pat. No. 4,498,811 and PCT Patent Application No. 03/042594, the plug is drawn by a cable housed inside the pipeline and operated by a winch on board the laying vessel. In another method, known as "pigging", the plug is pushed along the pipeline by compressed air supplied from a pumping station, such as a pumping station located at one end of the pipeline. PCT Patent Application No. 2007/040403 describes a plug that is moved along the pipeline by the difference in pressure upstream and downstream from the plug.

Another known way of moving the plug along the pipeline is to use a powered vehicle, which, however, requires an independent power source, as described in U.S. Pat. Nos. 3,837,214 and 3,978,678.

Each of the above described plug driving methods has pros and cons in terms of plug positioning precision, operating range, and production and installation cost and complexity.

The powered vehicle solution, in particular, has been found to perform particularly well along relatively very short pipelines not requiring much power range.

SUMMARY

The present disclosure relates to a module configured to generate electric power inside a pipeline, in particular as the pipeline is being laid.

It is an advantage of the present disclosure to provide a module configured to produce electric power inside the pipeline, so as to free the powered vehicle from an electric power source, and which provides for relatively easy operation of the vehicle even over relatively exceptionally long distances.

According to the present disclosure, there is provided a module configured to generate electric power inside a pipeline, in particular as the pipeline is being laid on the bed of a body of water, the module comprising a turbine configured to intercept an airflow fed into the pipeline in a travelling direction; and a rotating electric machine connected to the turbine, surrounding the turbine, and configured to produce electric power.

By virtue of the present disclosure, the module is able to produce electric power inside the pipeline using a relatively large-diameter rotating electric machine, which is therefore highly efficient even at relatively low speed.

In certain embodiments of the present disclosure, the module is configured to move along the inside of the pipeline in the travelling direction. This way, electric power can be produced at any point along the pipeline, with no need to connect the module by electric cables to a station close to one end of the pipeline.

In certain embodiments, the turbine is an axial turbine.

An axial turbine has proved highly efficient, even with relatively small airflows; moreover, generating relatively strong airflows inside the pipeline would be cost-prohibitive.

In certain embodiments, the module comprises an annular channel, in which the turbine is housed.

Channelling the airflow at the turbine improves the efficiency of the turbine.

In certain embodiments, the rotating electric machine is located outside the annular channel. This solution prevents exposing the electric machine to any contaminants in the airflow.

In certain embodiments, the annular channel is a tapering/flaring type to define a minimum cross section; the turbine being located at the minimum cross section. This way, it is possible to accelerate the airflow at the turbine and so improve the efficiency of the turbine.

In certain embodiments of the present disclosure, the turbine comprises a plurality of stator blades; and a plurality of rotor blades downstream from the plurality of stator blades in the travelling direction. This solution also provides for improving the efficiency of the turbine.

In certain embodiments, the rotating electric machine surrounds the rotor blades. This way, the rotor blades can be connected directly to the electric machine rotor.

In certain embodiments of the present disclosure, the module comprises a frame configured to be inserted inside and travel along the pipeline, and to support the turbine and the rotating electric machine.

The frame serves as a trolley and to support the turbine and the electric machine.

In certain embodiments, the module comprises a plurality of rolling bodies configured to contact the pipeline, and which are fitted, such as elastically, to the frame. In other words, the frame, which is substantially cylindrical, is detached from the pipeline by the rolling bodies, which provide for moving the frame smoothly in the travelling direction.

In certain embodiments, the module comprises a sealing ring fitted to the frame and selectively expandable to prevent airflow between the frame and the pipeline.

The sealing ring provides for concentrating the airflow in the turbine area, and preventing dispersion.

In certain embodiments of the present disclosure, the frame comprises a tubular structure; and an axial structure located inside the tubular structure to define a tapering/flaring annular channel.

The tubular structure and axial structure are positioned with respect to each other and shaped to form a tapering/flaring annular channel with a relatively large-diameter minimum cross section.

In certain embodiments, the tubular structure and axial structure are connected by spokes extending inside the annular channel.

The two parts of the frame are connected firmly to each other.

In certain embodiments, the tubular structure is configured to house the rotating electric machine and protect the rotating electric machine against external agents.

In certain embodiments, the axial structure supports, for rotation, part of the turbine and part of the rotating electric machine.

The present disclosure also relates to a system configured to produce electric power inside a pipeline.

According to the present disclosure, there is provided a system configured to produce electric power inside a pipeline, in particular an underwater pipeline as the pipeline is being laid, the system comprising a pipeline; a pump station connected to the pipeline and configured to feed an airflow into the pipeline in a travelling direction; and a module configured to intercept the airflow and generating electric power by a turbine connected to a rotating electric machine.

By virtue of the present disclosure, it is possible to transfer power from a station at one of a pipeline to any point along the pipeline relatively easily and effectively.

In certain embodiments, the system comprises a further module configured to adjust the airflow flow section. In other words, the airflow may be adjusted in a relatively simple, practical manner without involving the pump station.

In certain embodiments, the further module comprises a conduit and a shutter; the airflow flow section being defined by the distance between the conduit and the shutter.

The flow section may be either reduced or closed altogether. The further module may also be connected to other modules configured to perform modulating and, possibly, thrust functions.

The present disclosure also relates to a method of producing electric power inside a pipeline.

According to the present disclosure, there is provided a method of producing electric power inside a pipeline, in particular an underwater pipeline as the pipeline is being laid, the method comprising the steps of feeding an airflow into a pipeline in a travelling direction; and generating electric power by a module housed inside the pipeline to intercept the airflow.

Additional features and advantages are described in, and will be apparent from the following Detailed Description and the figures.

BRIEF DESCRIPTION OF THE DRAWINGS

A number of non-limiting embodiments of the present disclosure will be described by way of example with reference to the attached drawings, in which:

FIG. 1 shows a plan view, with parts removed for clarity, of a laying vessel in the process of laying a pipeline in a body of water;

FIG. 2 shows a side view, with parts removed for clarity, of the FIG. 1 laying vessel;

FIG. 3 shows a larger-scale lateral section, with parts removed for clarity, of a detail in FIG. 2;

DETAILED DESCRIPTION

Figure 4:
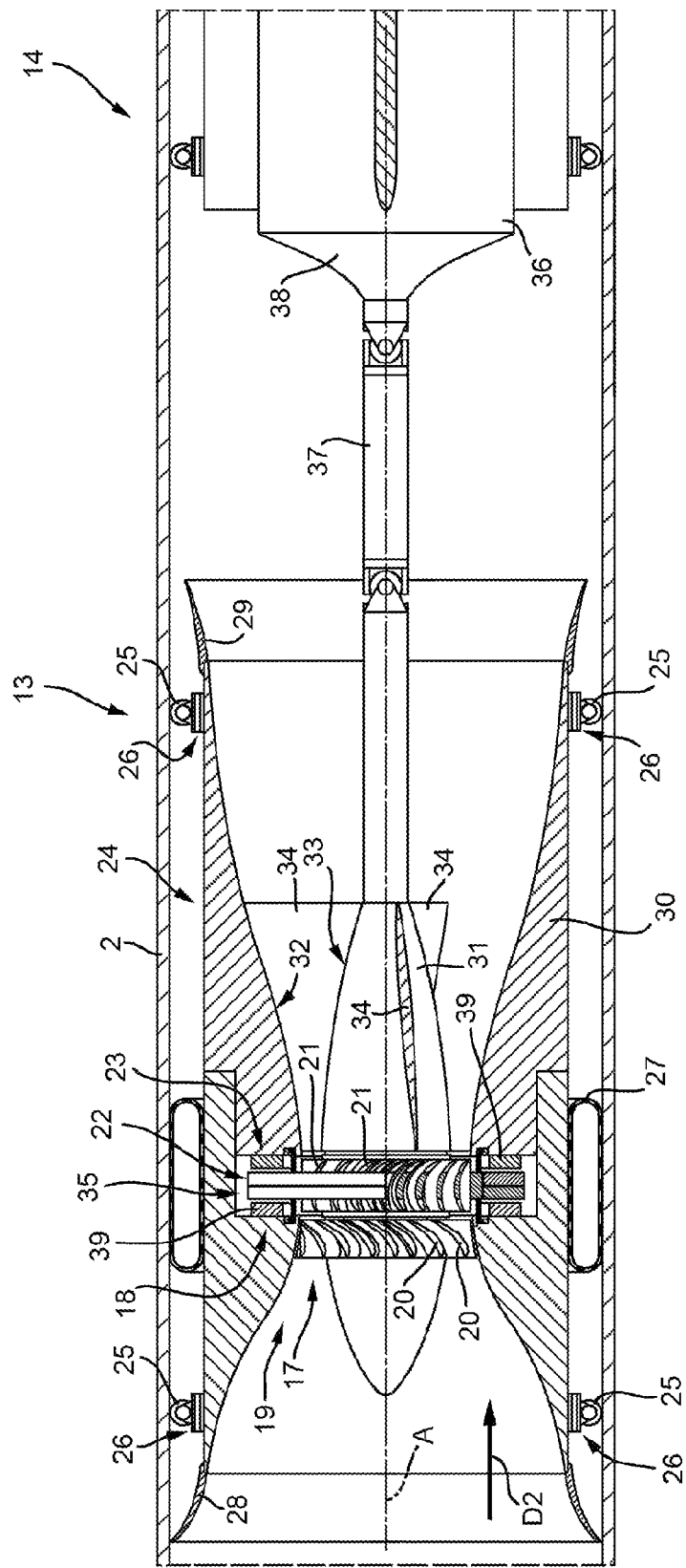
FIG. 4 shows a partly sectioned side view, with parts removed for clarity, of a module in accordance with the present disclosure.

Referring now to the example embodiments of the present disclosure illustrated in FIGS. 1 to 7, number 1 in FIG. 1 indicates as a whole a laying vessel in the process of laying a pipeline 2 in a body of water 3. As the pipeline is built, pipeline 2 is gradually launched from laying vessel 1 into body of water 3, and extends between a land-based pump station 4 and laying vessel 1.

FIG. 2 shows an S-lay vessel 1, it being understood, however, that the present disclosure also applies to pipelines 2 laid from J-lay vessels.

Laying vessel 1 is illustrated schematically, and comprises a floating structure 5 supporting a lay ramp 6 partly immersed in body of water 3 to partly guide pipeline 2 as pipeline comes off floating structure 5; and a control unit 7 configured to control the laying procedure.

In the example shown in the attached drawings, pipeline 2 assumes a characteristic 'S' shape between laying vessel 1 and the bed 8 of body of water 3, and forms two curves 9 and 10. Pipeline 2 is supported by lay ramp 6 along curve 9, but is unsupported along curve 10, which is located close to bed 8, or rather, at the touchdown point 11 at which pipeline 2 contacts bed 8. Touchdown point 11 moves from left to right in FIG. 2, as laying vessel 1 moves in a direction D1.

Pipeline 2 houses a powered vehicle 12 configured to plug pipeline 2 in the event of accidental flooding. The points at which pipeline 2 is most likely to fail, and therefore flood, are located along the part suspended between laying vessel 1 and bed 8. So, vehicle 12 serves to prevent the portion of pipeline 2 on bed 8 from flooding. Accordingly, vehicle 12 is moved gradually along the inside of pipeline 2 in a travelling direction D2 as laying vessel 1 moves in direction D1. The terms 'upstream' and 'downstream' used herein refer to travelling direction D2.

With reference to FIG. 3, vehicle 12 is configured to move in travelling direction D2, and comprises a plurality of substantially cylindrical modules 13, 14, 15, 16, which are arranged successively in travelling direction D2, are connected to one another in articulated manner, and are configured to roll along the wall of pipeline 2. Each of modules 13, 14, 15, 16 is configured to perform a specific function:

module 13 is configured to generate electric power;
module 14 is configured to store and manage the electric power produced by module 13;
module 15 has powered and braking wheels configured to drive and stop vehicle 12;
module 16 acts as a plug, and has expandable bladders (not shown in the drawings) configured to adhere to the inner surface of pipeline 2 and to plug pipeline 2 when necessary.

Alternatively, modules 13, 14, 15 and 16 may all be powered. And vehicle 12 may comprise a different number or quantity of modules from that shown.

In certain embodiments, vehicle 12 is equipped with a telecommunications system, so vehicle can be remote-controlled (e.g., from laying vessel 1 (FIG. 2)).

With reference to FIG. 4, module 13 comprises a turbine 17 configured to intercept an airflow fed into pipeline 2 in travelling direction D2; and a rotating electric machine 18 connected to turbine 17. In other words, turbine 17 converts the energy in the airflow to kinetic rotational energy, and rotating electric machine 18 converts the kinetic rotational energy to electric power.

With reference to FIG. 2, the airflow is produced by pump station 4, which communicates directly with one end of pipeline 2. Pump station 4 is configured to produce a slight overpressure inside pipeline 2, so that the airflow produced flows along the whole of pipeline 2 as pipeline is being built. The overpressure produced by pump station 4 is relatively low, such as ranging between 0.2 bar and 0.5 bar.

Alternatively, the airflow is produced by a suction station 4' located on laying vessel 1 and communicating directly with one end of pipeline 2. Suction station 4' is configured to produce a slight vacuum inside pipeline 2, so that the airflow produced flows along the whole of pipeline 2 as pipeline is being built. The vacuum produced by suction station 4' is relatively low, such as ranging between −0.2 bar and −0.5 bar.

Module 13 has a tapering/flaring annular channel 19, which therefore has a minimum cross section where the airflow reaches maximum speed. Turbine 17 is located at the minimum cross section of annular channel 19.

In certain embodiments, turbine 17 is an axial turbine with an axis of rotation A, and comprises a plurality of stator blades 20; and a plurality of rotor blades 21 downstream from stator blades 20 in travelling direction D2.

Rotating electric machine 18 is annular and surrounds rotor blades 21.

Rotating electric machine 18 comprises a rotor 22 and a stator 23. Rotor 22 is fixed directly to the distal end of rotor blades 21. And rotating electric machine 18 is located outside annular channel 19, clear of the airflow.

Structurally, module 13 comprises a frame 24 which is configured to be inserted inside and travel along pipeline 2, and to support turbine 17 and rotating electric machine 18, and inside which annular channel 19 extends.

To reduce drag inside pipeline 2, module 13 comprises a plurality of rolling bodies 25 positioned contacting pipeline 2 and fitted to frame 24, such as elastically, and more specifically by connecting rolling bodies 25 to frame 24 by elastomer blocks 26.

Because rolling bodies 25 separate frame 24 from pipeline 2, module 13 comprises a selectively expandable sealing ring 27 to prevent airflow outside frame 24.

Module 13 has an annular baffle 28 fitted to frame 24 to channel the airflow along pipeline 2 into annular channel 19.

Module 13 also comprises a further annular baffle 29 fitted to frame 24 to guide the airflow out of annular channel 19.

In certain embodiments, annular baffles 28 and 29 are made of rubber or materials with the same characteristics as rubber.

Frame 24 comprises a tubular structure 30; and an axial structure 31 located inside tubular structure 30. Tubular structure 30 and axial structure 31 are configured to define tapering/flaring annular channel 19. More specifically, tubular structure 30 has a venturi-tube-shaped inner face 32. And, to further increase airflow speed in the centre area, axial structure 31 has an ogival outer surface 33 at the minimum cross section of inner surface 32.

Tubular structure 30 and axial structure 31 are connected by spokes 34 which extend inside annular channel 19, downstream from turbine 17.

Tubular structure 30 has an annular compartment 35 surrounding rotor blades 21 and configured to house rotating electric machine 18.

Stator blades 20 extend from axial structure 31 to tubular structure 30, and are, in certain embodiments, fixed to both tubular structure 30 and axial structure 31.

Rotor blades 21 are fitted in rotary manner to axial structure 31.

Frame 24 is connected to module 14, which comprises a frame 36. In the example shown, axial structure 31 and frame 36 are connected by a tube 37 connected in articulated manner to both axial structure 31 and frame 36.

Module 14 comprises a baffle 38 configured to divert outside frame 36 the airflow from annular channel 19.

Figure 5:
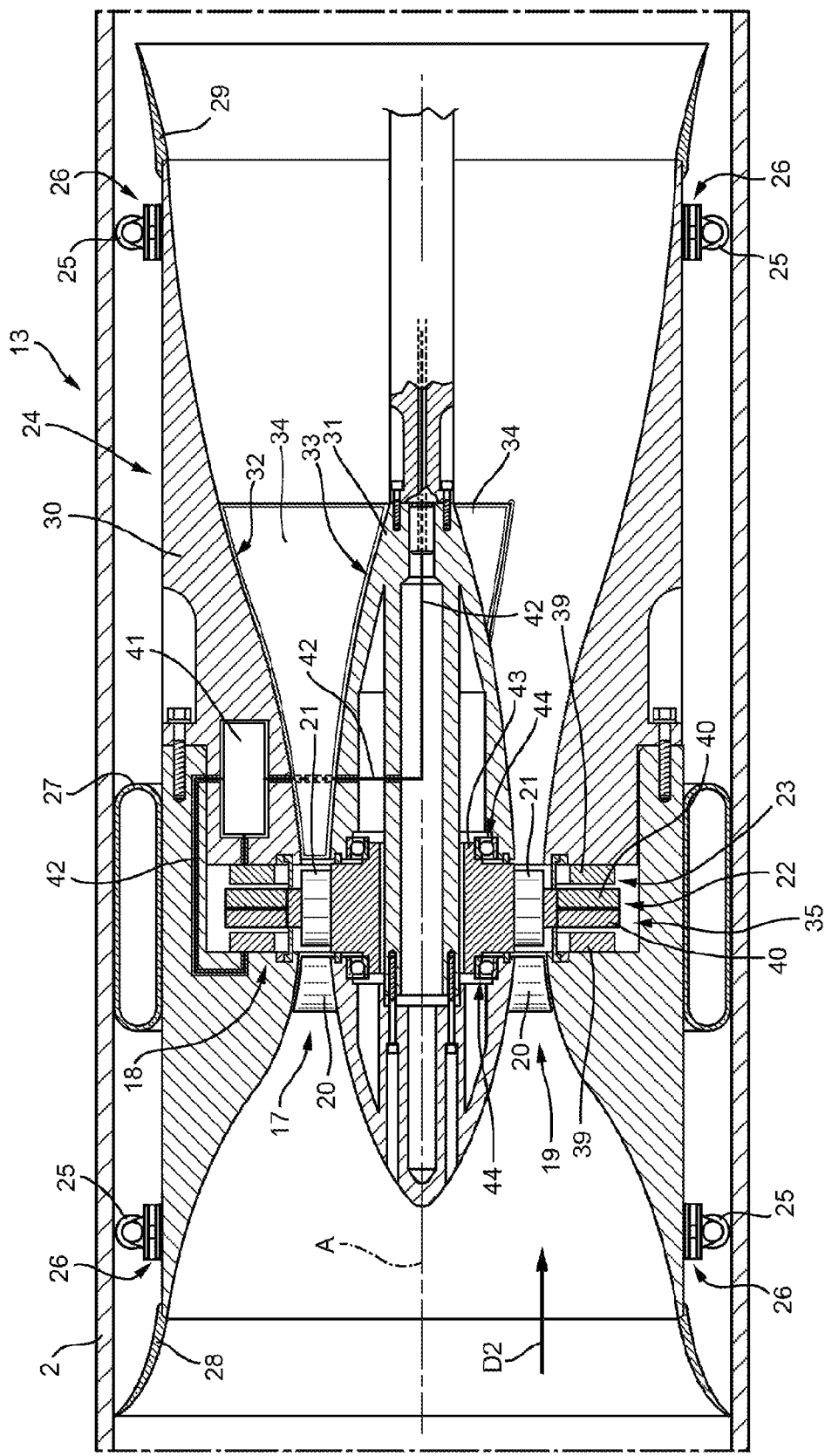
FIG. 5 shows a larger-scale section, with parts removed for clarity, of the FIG. 4 module.

In the FIG. 5 example, rotating electric machine 18 is a double axial air gap type, and comprises two active stator parts 39, which are defined, for example, by electric windings and respective magnetic guides, and are fitted to tubular structure 30, inside compartment 35; and two active rotor parts 40, which are defined, for example, by permanent magnets and respective magnetic guides, and are fitted to a rim integral with the distal ends of rotor blades 21.

Module 13 comprises a control device 41 configured to control rotating electric machine 18. Control device 41 is connected to active parts 39, and controls electric power transmission from rotating electric machine 18 to module 14 (FIG. 4), by which the electric power is stored.

Tubular structure 30 houses control device 41 and part of the cables 42 connecting active parts 39 to module 14 (FIG. 4). Connecting cables 42 are also housed inside at least one of spokes 34, axial structure 31, and tube 37.

Inside, axial structure 31 has a hub 43 configured to support rotor blades 21; and two bearings 44 configured to support hub 43 with respect to axial structure 31.

With reference to FIG. 2, electric power is produced by the system comprising pipeline 2, pump station 4, and module 13.

In actual use, pump station 4 produces a 0.2 to 0.5 bar overpressure inside pipeline 2. The overpressure produces an airflow in travelling direction D2; the airflow flows over turbine 17 (FIG. 4), which rotates about axis A and rotates rotor 22 (FIG. 5) of electric rotating machine 18, which in turn produces electric power in stator 23.

With reference to FIG. 4, when starting up turbine 17, control device 41 may have to operate rotating electric machine 18 as a motor, as opposed to a generator, to provide the necessary power to start turbine 17.

In certain embodiments, once started, turbine 17 is never stopped, regardless of whether module 13 is moving or stationary. It should be appreciated that turbine 17 produces more electric power when module 13 is stationary, for two reasons:

(i) the speed of the airflow with respect to turbine 17 is higher when module 13 is stationary than when module 13 is moving; and (ii) when module 13 is stationary, airflow outside frame 24 can be prevented, and the airflow channelled entirely into annular channel 19.

The location of rotating electric machine 18 outwards of turbine 17 makes it possible to maximize the size of rotating electric machine, form numerous field poles in rotating electric machine 18, and achieve a high output from rotating electric machine 18, even at relatively low rotation speeds of turbine 17.

Figure 6:
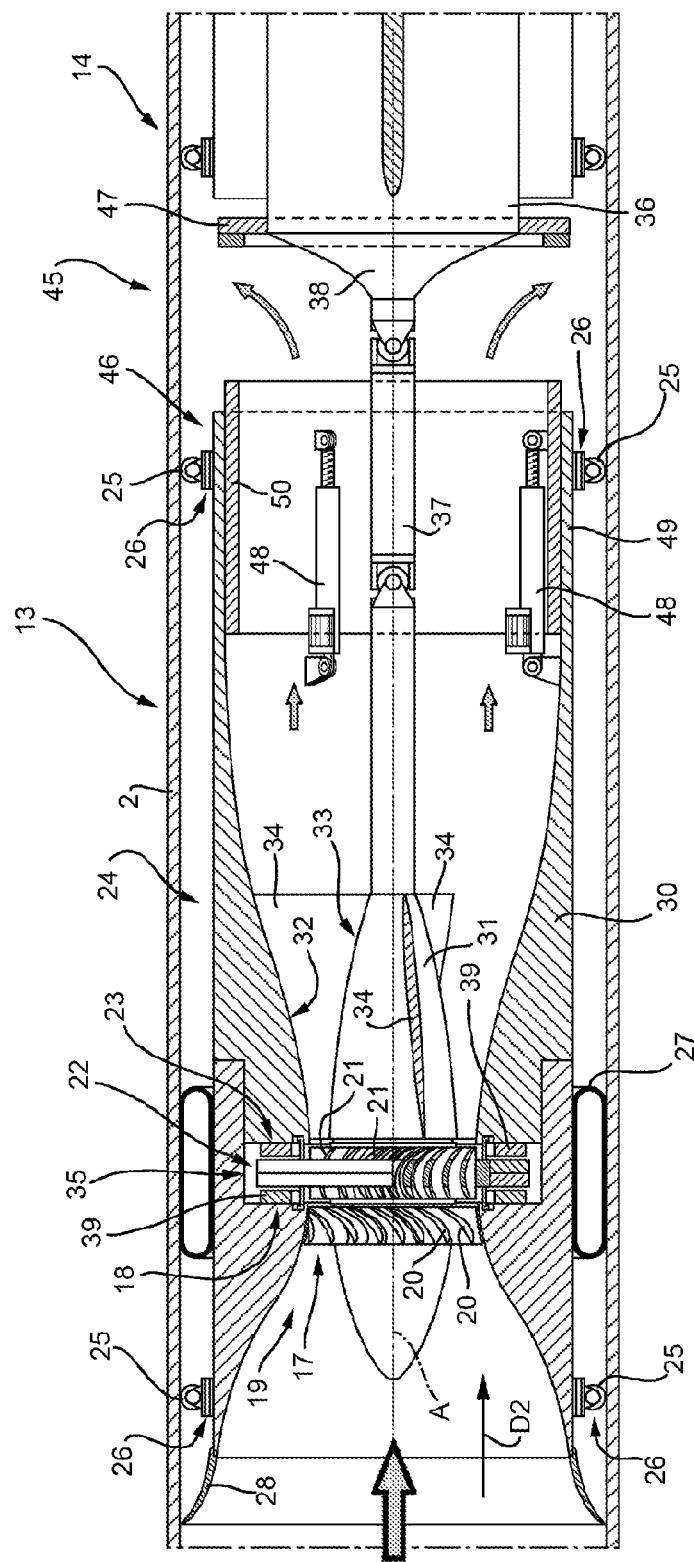
FIG. 6 shows a section, with parts removed for clarity, of a further module in accordance with the present disclosure.

Number 45 in FIG. 6 indicates as a whole a module configured to adjust airflow by adjusting the airflow flow section.

Module 45 comprises a conduit 46 and a shutter 47. And the airflow flow section is defined by the distance between conduit 46 and shutter 47.

Module 45 comprises an actuator 48 configured to adjust the distance between conduit 46 and shutter 47 between zero and a designated or given value.

Conduit 46 is telescopic, and comprises a fixed tube 49; and a movable tube 50 connected slidably to fixed tube 49 and connected to actuator 48, by which conduit is moved with respect to fixed tube 49 and actuator 48 itself.

When positioned contacting shutter 47, which in the example shown is in the form of a blind flange, movable tube 50 closes the flow section completely.

In a variation (not shown in the drawings), the movable tube is perforated. So, the module never cuts off the airflow completely, but acts as a dissipater.

In FIG. 6, module 45 is located between modules 13 and 14, and serves to adjust the airflow through module 13. Module 45 is actually connected rigidly to and integrated in module 13. The module 45 described, however, may also be used as a thrust module without module 13, and may assume different configurations from the one described with reference to FIG. 6.

Figure 7:
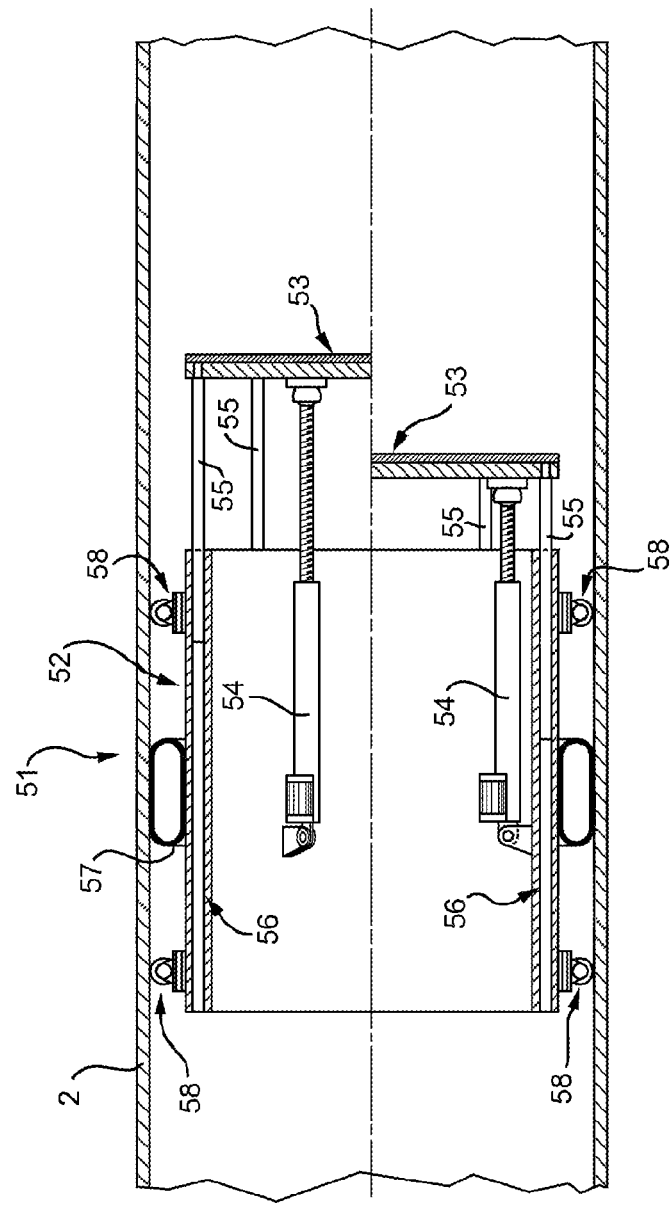
FIG. 7 shows a section, with parts removed for clarity, of a variation of the further module.

Number 51 in FIG. 7 indicates as a whole a module configured to adjust airflow by adjusting the airflow flow section, and comprises a conduit 52 and a shutter 53. The airflow flow section is defined by the distance between conduit 52 and shutter 53.

Module 51 comprises an actuator 54 configured to adjust the distance between conduit 52 and shutter 53 between zero and a designated or given value.

Conduit 52 and shutter 53 are connected slidably to each other. In the example shown, shutter 53 has a plurality of arms 55 connected to actuator 54, and which engage respective pockets 56 formed in conduit 52.

Module 51 also has a sealing ring 57 located on the outside of conduit 52; and rolling bodies 58 connected elastically to conduit 52.

The present disclosure also applies to cleaning, testing, inspection and maintenance vehicles configured to run along the inside of pipelines.

Clearly, changes may be made to the embodiments described of the present disclosure without, however, departing from the protective scope of the accompanying Claims. That is, various changes and modifications to the presently disclosed embodiments will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as followed:

1. An electric power generating module comprising:
    a turbine configured to be positioned inside a pipeline and intercept an airflow fed into the pipeline in a direction of travel as the pipeline is being laid on a bed of a body of water; and
    a rotatable electric machine connected to the turbine, said rotatable electric machine surrounding the turbine and being configured to produce electric power inside the pipeline, wherein a frame which supports the turbine and the rotatable electric machine is selectively moved inside the pipeline in the travelling direction as the pipeline is being laid from a laying vessel to on the bed of the body of water.

2. The electric power generating module of claim 1, wherein the turbine is an axial turbine.

3. The electric power generating module of claim 1, which includes an annular channel, wherein the turbine is housed inside the annular channel.

4. The electric power generating module of claim 3, wherein the rotatable electric machine is located outside the annular channel.

5. The electric power generating module of claim 3, wherein:
    the annular channel is a tapering and flaring annular channel which defines a minimum cross section, and
    the turbine is located at the defined minimum cross section.

6. The electric power generating module of claim 1, wherein the turbine includes:
    a plurality of stator blades; and
    a plurality of rotor blades downstream, in the travelling direction, from the plurality of stator blades.

7. The electric power generating module of claim 6, wherein the rotatable electric machine surrounds the rotor blades.

8. The electric power generating module of claim 7, wherein the rotatable electric machine includes a rotor fixed to a distal end of the rotor blades.

9. The electric power generating module of claim 1, which includes a plurality of rolling bodies fitted to the frame and configured to contact the pipeline.

10. The electric power generating module of claim 9, wherein the plurality of rolling bodies are elastically fitted to the frame.

11. The electric power generating module of claim 1, which includes a sealing ring fitted to the frame and selectively expandable to prevent airflow between the frame and the pipeline.

12. The electric power generating module of claim 1, wherein the frame includes:
    a tubular structure; and
    an axial structure located inside the tubular structure, said axial structure defines a tapering and flaring annular channel.

13. The electric power generating module of claim 12, wherein the tubular structure and the axial structure are connected by at least one spoke extending inside the annular channel.

14. The electric power generating module of claim 12, wherein the tubular structure is configured to house the rotatable electric machine.

15. The electric power generating module of claim 12, which includes a control device housed in the tubular structure and configured to control the rotatable electric machine.

16. The electric power generating module of claim 12, wherein the axial structure rotatably supports part of the turbine and part of the rotatable electric machine.

17. An electric power producing system comprising:
   a pipeline;
   a pump station connected to the pipeline and configured to feed an airflow into the pipeline in a travelling direction; and
   a vehicle configured to selectively move inside the pipeline in the travelling direction as the pipeline is being laid from a laying vessel to on a bed of a body of water and including a first module including:
   a turbine configured to be positioned inside the pipeline and to intercept the airflow, and
   a rotatable electric machine connected to the turbine, said rotatable electric machine surrounding the turbine and being configured to produce electric power aboard the vehicle inside the pipeline.

18. The electric power producing system of claim 17, which includes a second module connected to the first module and configured to adjust an airflow flow section.

19. The electric power producing system of claim 18, wherein the second module includes:
   a conduit, and
   a shutter such that the airflow flow section is defined by a distance between the conduit and the shutter.

20. The electric power producing system of claim 19, wherein the distance between the conduit and the shutter is adjustable, via an actuator, from a zero value to a designated value.

21. An electric power producing system comprising:
   a pipeline;
   a suction station connected to the pipeline and configured to feed an airflow into the pipeline in a travelling direction; and
   a vehicle configured to selectively move inside the pipeline in the travelling direction as the pipeline is being laid from a laying vessel to on a bed of a body of water and including a module including:
   a turbine configured to be positioned inside the pipeline and to intercept the airflow, and
   a rotatable electric machine connected to the turbine, said rotatable electric machine surrounding the turbine and being configured to produce electric power aboard the vehicle inside the pipeline.

22. A method of producing electric power inside a pipeline, the method comprising:
   feeding an airflow into the pipeline in a travelling direction;
   selectively moving a vehicle inside the pipeline in the travelling direction as the pipeline is being laid from a laying vessel to on a bed of a body of water; and
   generating electric power aboard the vehicle utilizing a module of the vehicle housed inside the pipeline by:
   causing a turbine to intercept the airflow, and causing a rotatable electric machine connected to the turbine and surrounding the turbine to produce said electric power aboard the vehicle inside the pipeline.

23. An electric power producing system comprising:
   a pipeline;
   a pump station connected to the pipeline and configured to feed an airflow into the pipeline in a travelling direction;
   a first module including:
   a turbine configured to be positioned inside the pipeline and to intercept the airflow, and
   a rotatable electric machine connected to the turbine, said rotatable electric machine surrounding the turbine and being configured to produce electric power inside the pipeline; and
   a second module connected to the first module, configured to adjust an airflow flow section and including a telescopic conduit, and a shutter such that the airflow flow section is defined by a distance between the conduit and the shutter, and the distance between the conduit and the shutter is adjustable by lengthening and shortening the telescopic conduit.

\* \* \* \* \*